(12) United States Patent
Asaka (10) Patent No.: US 10,763,912 B2
(45) Date of Patent: Sep. 1, 2020

(54) DEMODULATION APPARATUS, RECEPTION APPARATUS, AND DEMODULATION METHOD

(71) Applicant: PANASONIC INTELLECTUAL PROPERTY MANAGEMENT CO., LTD., Osaka (JP)

(72) Inventor: Koichi Asaka, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/667,566

(22) Filed: Oct. 29, 2019

(65) Prior Publication Data

US 2020/0145040 A1 May 7, 2020

(30) Foreign Application Priority Data

Nov. 2, 2018 (JP) ................................. 2018-207697

(51) Int. Cl.
*H04B 1/403* (2015.01)
*H04B 1/16* (2006.01)
*H04H 40/18* (2008.01)
*H04H 20/22* (2008.01)

(52) U.S. Cl.
CPC .......... *H04B 1/406* (2013.01); *H04B 1/1646* (2013.01); *H04H 20/22* (2013.01); *H04H 40/18* (2013.01)

(58) Field of Classification Search
CPC .......... G06F 3/165; H04B 1/406; H04B 1/40; H04B 1/401; H04B 1/1646; H04H 20/20; H04H 20/22; H04H 20/426; H04H 40/18; H04H 40/36; H04H 60/00; H04H 60/11;
(Continued)

(56) References Cited

U.S. PATENT DOCUMENTS 5,532,762 A * 7/1996 Sakai ..................... H04N 5/605
348/731
5,598,430 A * 1/1997 Hachisuka ............... H04B 1/26
375/216
(Continued)

FOREIGN PATENT DOCUMENTS

WO 2011/102144 8/2011

*Primary Examiner* — Xu Mei
(74) *Attorney, Agent, or Firm* — Greenblum & Bernstein, P.L.C.

(57) ABSTRACT

A demodulation apparatus according to the present disclosure includes an analog audio demodulator, a digital audio demodulator, a selection circuit, and a noise addition circuit. The analog audio demodulator demodulates a received signal of an analog radio broadcast wave into an analog audio signal and outputs the analog audio signal. The digital audio demodulator demodulates a received signal of a digital radio broadcast wave into a digital audio signal and outputs the digital audio signal, the analog/digital radio broadcast waves including audio signals indicative of a same content and being broadcasted simultaneously. The selection circuit selects either the analog audio signal or the digital audio signal. The noise addition circuit adds noise to the digital audio signal in a first period including a switching period for switching from a state where the analog audio signal is selected to a state where the digital audio signal is selected.

15 Claims, 9 Drawing Sheets

(58) Field of Classification Search
CPC ............... H04H 60/12; H04H 2201/18; H04H 2201/183; H04H 2201/186
USPC ..... 700/94; 381/2, 3, 4, 6, 7, 11, 14, 15, 16, 381/123; 455/130
See application file for complete search history.

(56) References Cited

U.S. PATENT DOCUMENTS

| | | | | |
|---|---|---|---|---|
| 5,809,065 | A * | 9/1998 | Dapper | H03D 5/00 329/347 |
| 7,170,950 | B2 * | 1/2007 | Wildhagen | H03C 1/60 375/295 |
| 7,433,425 | B1 * | 10/2008 | Lou | H04H 20/26 375/316 |
| 7,546,088 | B2 * | 6/2009 | Kroeger | H04H 20/30 375/322 |
| 8,036,324 | B2 * | 10/2011 | Suzuki | H04N 5/52 375/345 |
| 8,249,497 | B2 * | 8/2012 | Ingrassia | G06Q 30/02 455/3.01 |
| 8,417,179 | B2 * | 4/2013 | Watanabe | H04B 1/1646 455/3.01 |
| 9,252,899 | B2 * | 2/2016 | Pahuja | H04H 40/36 |
| 10,056,070 | B2 * | 8/2018 | Gautama | H04H 40/72 |
| 2004/0043730 | A1 * | 3/2004 | Schill | H04H 20/26 455/130 |
| 2012/0316663 | A1 | 12/2012 | Sasanabe et al. | |
| 2014/0355764 | A1 * | 12/2014 | Elenes | H04H 20/30 381/3 |

* cited by examiner

DEMODULATION APPARATUS, RECEPTION APPARATUS, AND DEMODULATION METHOD

CROSS-REFERENCE TO RELATED APPLICATIONS

This application is based upon and claims the benefit of priority from Japanese Patent Application No. 2018-207697, filed Nov. 2, 2018, the entire contents of which are incorporated herein by reference.

FIELD

Embodiments described herein relate generally to a demodulation apparatus, a reception apparatus, and a demodulation method.

BACKGROUND

Terrestrial radio broadcasting in North America is called HD radio and employs the in-band on-channel (IBOC) technology. According to the IBOC standard, analog and digital radio broadcast waves are transmitted. The analog radio broadcast waves are obtained by modulating audio signals with amplitude modulation (AM) or frequency modulation (FM). The digital radio broadcast waves are obtained by modulating audio signals with orthogonal frequency division multiplexing (OFDM) modulation. The IBOC standard requires transmitting the digital radio broadcast waves in frequency bands on both sides of a frequency band of the analog radio broadcast waves. Therefore, in the IBOC standard, a radio reception apparatus can receive the analog radio broadcast waves and the digital radio broadcast waves simultaneously by receiving radio waves on one frequency.

In the IBOC standard, the analog radio broadcast waves and the digital radio broadcast waves, which are transmitted in the same frequency band, include audio signals representing the same content. When the reception state is good, the radio reception apparatus can demodulate and output the audio signals of the digital radio broadcast waves. When the reception state is bad, the radio reception apparatus can demodulate and output the audio signals of the analog radio broadcast waves.

When the reception state changes from the bad state to the good state, the radio reception apparatus switch output signals from audio signals of the analog radio broadcast waves to audio signals of the digital radio broadcast waves. Thus, the radio reception apparatus can output the audio signals having appropriate quality corresponding to the reception state.

However, quality of the audio signals of the analog radio broadcast waves is significantly different from that of the audio signals of the digital radio broadcast waves. Consequently, quality of audio signals output by the radio reception apparatus suddenly becomes good at the timing of switching the output signals from the audio signals of the analog radio broadcast waves to those of the digital radio broadcast waves. This may give great aural discomfort to users.

SUMMARY

A demodulation apparatus according to the present disclosure includes an analog audio demodulator, a digital audio demodulator, a selection circuit, and a noise addition circuit. The analog audio demodulator is configured to demodulate a received signal of an analog radio broadcast wave into an analog audio signal and output the analog audio signal. The digital audio demodulator is configured to demodulate a received signal of a digital radio broadcast wave into a digital audio signal and output the digital audio signal, the digital radio broadcast wave including an audio signal indicative of a same content as an audio signal included in the analog radio broadcast wave and being broadcasted simultaneously with the analog radio broadcast wave. The selection circuit is configured to select, as an output audio signal, either the analog audio signal or the digital audio signal. The noise addition circuit is configured to add noise to the digital audio signal in a first period including a switching period for switching from a state where the analog audio signal is selected as the output audio signal to a state where the digital audio signal is selected as the output audio signal.

DETAILED DESCRIPTION

Exemplary embodiments of a reception apparatus 10 according to the present disclosure are described below with reference to the accompanying drawings.

Figure 1:
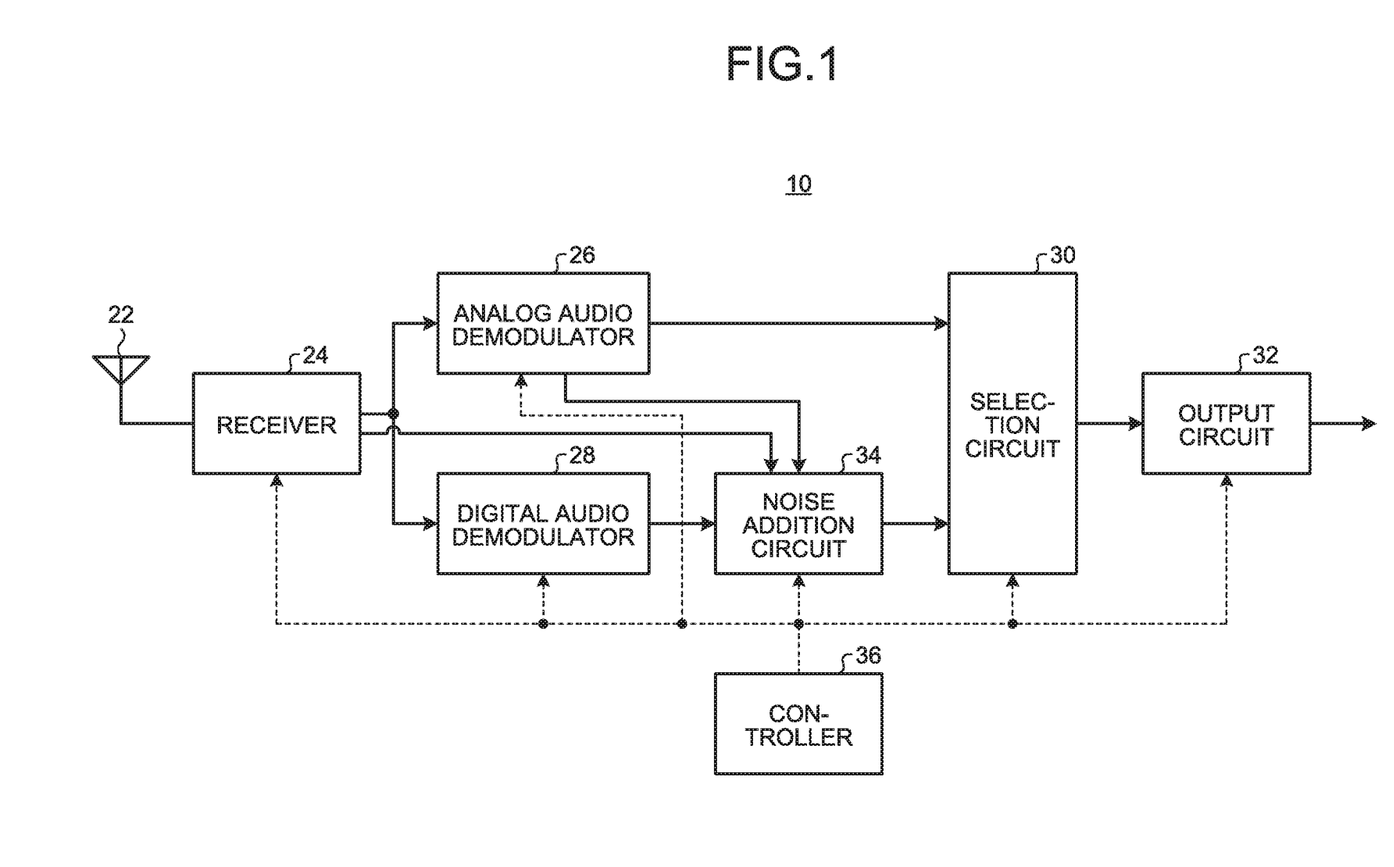
FIG. 1 is a structural diagram of a reception apparatus according to an embodiment.

FIG. 1 is a structural diagram of a reception apparatus according to an embodiment. The reception apparatus 10 receives and demodulates terrestrial analog and digital radio broadcast waves to output audio signals. The analog radio broadcast waves and the digital radio broadcast waves according to the present embodiment include audio signals representing the same content and are broadcasted simultaneously.

The analog radio broadcast waves include AM-modulated or FM-modulated audio signals. The digital radio broadcast waves include OFDM-modulated audio signals. The analog radio broadcast waves and the digital radio broadcast waves according to the present embodiment conform to the IBOC standard employed for HD radio in North America. Consequently, the digital radio broadcast waves according to the present embodiment are transmitted in frequency bands on both sides of a frequency band of the analog radio broadcast waves. Alternatively, the analog radio broadcast waves and the digital radio broadcast waves do not necessarily conform to the IBOC standard and may be modulated in different frequency bands as described in modifications, which will be described later.

The reception apparatus 10 includes an antenna 22, a receiver 24, an analog audio demodulator 26, a digital audio demodulator 28, a selection circuit 30, an output circuit 32, a noise addition circuit 34, and a controller 36. Among those, the analog audio demodulator 26, the digital audio demodulator 28, the selection circuit 30, the output circuit 32, the noise addition circuit 34, and the controller 36 function as a demodulation apparatus in the reception apparatus 10. The demodulation apparatus may be mounted on a semiconductor device differing from the receiver 24, for example.

The antenna 22 captures analog and digital radio broadcast waves radiated above the ground. The receiver 24 receives a first signal that is modulated into the analog radio broadcast waves captured by the antenna 22 and a second signal that is modulated into the digital radio broadcast waves captured by the antenna 22. The receiver 24 gives the first signal to the analog audio demodulator 26. The first signal is a received signal of the analog radio broadcast waves. For example, the first signal is an intermediate frequency signal. The receiver 24 gives the second signal to the digital audio demodulator 28. The second signal is a received signal of the digital radio broadcast waves. For example, the second signal is an intermediate frequency signal.

The receiver 24 measures an intensity of a received electric field of the analog radio broadcast waves. The receiver 24 gives, to the noise addition circuit 34, a value representing the measured received electric field intensity of the analog radio broadcast waves.

The analog audio demodulator 26 demodulates the received signals of the analog radio broadcast waves and outputs analog audio signals. The analog audio demodulator 26 performs, for example, AM or FM demodulation on the received signals of the analog radio broadcast waves to output the analog audio signals. The analog audio signals according to the present embodiment are digital data representing audio obtained by demodulating the received signals of the analog radio broadcast waves. The analog audio signals may be analog audio signals. The analog audio signals output from the analog audio demodulator 26 are given to the selection circuit 30.

The analog audio demodulator 26 calculates the signal to noise ratio (S/N ratio) of the received signals of the analog radio broadcast waves, the carrier to noise ratio (C/N ratio) of the received signals of the analog radio broadcast waves, and a multipath detection value representing the amount of multipath signal components included in the analog radio broadcast waves.

The analog audio demodulator 26 calculates the S/N ratio by, for example, comparing a demodulated signal level with a noise level. The analog audio demodulator 26, for example, calculates the C/N ratio based on signal spectra of the intermediate frequency signals received from the receiver 24. Alternatively, the analog audio demodulator 26, for example, calculates the C/N ratio based on signal components of the frequency including the analog audio signals and the amount of noise included in the frequencies on both sides of the signal components. In the analog radio broadcast waves, the C/N ratio and the S/N ratio have a correlation, so that the analog audio demodulator 26 can estimate the S/N ratio based on the C/N ratio. When the analog radio broadcast waves include multipath, noise increases in high-frequency components of FM-modulated baseband signals. Consequently, the analog audio demodulator 26 calculates the amount of noise in the high-frequency components of the FM-modulated baseband signals as the multipath detection value.

The digital audio demodulator 28 demodulates the received signals of the digital radio broadcast waves and outputs digital audio signals. The digital audio demodulator 28 performs, for example, OFDM demodulation on the received signals of the digital radio broadcast waves to output the digital audio signals. The digital audio signals according to the present embodiment are digital data representing audio obtained by demodulating the received signals of the digital radio broadcast waves. The digital audio signals may be analog audio signals. The digital audio signals output from the digital audio demodulator 28 are given to the selection circuit 30 via the noise addition circuit 34. The digital audio demodulator 28 may calculate the C/N ratio of the received signals of the digital radio broadcast waves. For example, the digital audio demodulator 28 calculates, as the C/N ratio, an error rate in Viterbi decoding that is performed on data obtained by OFDM demodulation. Either the analog audio demodulator 26 or the digital audio demodulator 28 may calculate the C/N ratio, or both of them may calculate the C/N ratio.

The selection circuit 30 receives the analog audio signals from the analog audio demodulator 26. The selection circuit 30 receives the digital audio signals from the digital audio demodulator 28 via the noise addition circuit 34. The selection circuit 30 selects either the analog audio signals or the digital audio signals and outputs the selected audio signals as output audio signals to the output circuit 32 on the following stage.

At a timing designated by the controller 36, the selection circuit 30 switches a selection of output audio signals from the analog audio signals to the digital audio signals. The selection circuit 30 switches from the analog audio signals to the digital audio signals when, for example, the reception state changes from a bad state to a good state. In switching the output audio signals from the analog audio signals to the digital audio signals, the selection circuit 30 smoothly performs the switching in a predetermined switching period (e.g., approximately 1 second). The selection circuit 30 lowers levels of the analog audio signals and raises levels of the digital audio signals over time during the switching period.

The output circuit 32 transmits, to an external device, the output audio signals output from the selection circuit 30. The output circuit 32 transmits the output audio signals to another device via a predetermined digital communication path, for example. The output circuit 32 may convert the output audio signals into analog audio signals and transmit them to, for example, an amplification device for driving a speaker.

The noise addition circuit 34 adds noise to the digital audio signals output from the digital audio demodulator 28 in the switching period for switching from a state where the selection circuit 30 selects the analog audio signals as the output audio signals to a state where the selection circuit 30 selects the digital audio signals as the output audio signals. In the switching period, the noise addition circuit 34 adds, to the digital audio signals, noise having an amount corresponding to that in noise included in the analog audio signals.

For example, the noise addition circuit 34 adds, to the digital audio signals, noise having such an amount that makes the S/N ratio equal to that of the analog audio signals. In the switching period, the noise addition circuit 34 may add, to the digital audio signals, noise having an amount corresponding to the received electric field intensity of the analog radio broadcast waves. Alternatively, in the switching period, the noise addition circuit 34 may add, to the digital audio signals, noise having an amount corresponding to the S/N ratio of the received signals of the analog radio broadcast waves. Still alternatively, in the switching period, the noise addition circuit 34 may add, to the digital audio signals, noise having an amount corresponding to the C/N ratio of the received signals of the analog radio broadcast waves. Still alternatively, in the switching period, the noise addition circuit 34 may add, to the digital audio signals, noise having an amount corresponding to the C/N ratio of the received signals of the digital radio broadcast waves. When both of the C/N ratio of the received signals of the analog radio broadcast waves and the C/N ratio of the received signals of the digital radio broadcast waves have been calculated, the noise addition circuit 34 may add noise corresponding to both of the values or one of the values. Still alternatively, in the switching period, the noise addition circuit 34 may add, to the digital audio signals, noise having an amount corresponding to the multipath detection value of the analog radio broadcast waves.

Subsequent to the switching period, the noise addition circuit 34 reduces the amount of noise to be added to the digital audio signals over time. For example, the noise addition circuit 34 attenuates the noise by a predetermined amplitude level every predetermined time. The noise addition circuit 34 may attenuate the noise linearly or gradually. The noise addition circuit 34 then reduces the amount of noise to be added to the digital audio signals to 0 at a timing (an addition end timing $t_E$) when a predetermined period has elapsed since the switching period. After the addition end timing $t_E$, the noise addition circuit 34 does not add noise to the digital audio signals.

The controller 36 controls individual components contained in the reception apparatus 10. For example, the controller 36 controls the switching timing at which the selection circuit 30 switches the output audio signals between the digital audio signals and the analog audio signals. The controller 36 also controls the timing at which the noise addition circuit 34 adds noise.

Figure 2:
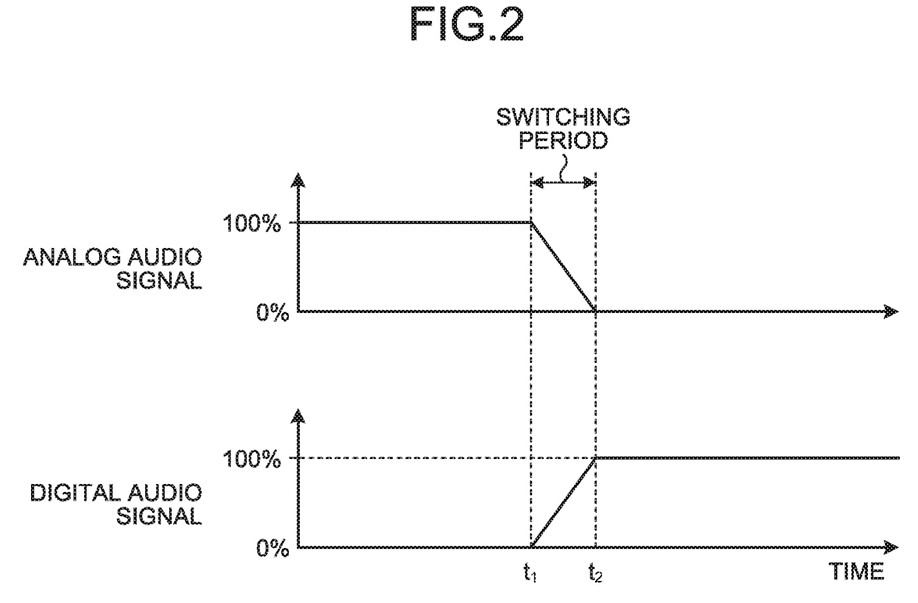
FIG. 2 is a graph representing ratios between analog audio signals and digital audio signals included in output audio signals in a switching period.

FIG. 2 is a graph representing ratios between analog audio signals and digital audio signals included in output audio signals in a switching period. When the reception state is switched from a bad state to a good state, the selection circuit 30 switches from a state of selecting the analog audio signals as the output audio signals to a state of selecting the digital audio signals as the output audio signals in the switching period that is, for example, approximately 1 second. When the reception state is switched from a state where the reception apparatus 10 fails to demodulate the digital audio signals from the received signals of the digital radio broadcast waves to a state where the reception apparatus 10 can demodulate the digital audio signals, the selection circuit 30 switches from a state of selecting the analog audio signals as the output audio signals to a state of selecting the digital audio signals as the output audio signals.

From a switching start timing $t_1$ to a switching end timing $t_2$, the selection circuit 30 reduces the percentage of the analog audio signals included in the output audio signals from 100% to 0% over time. The selection circuit 30 attenuates the analog audio signals by, for example, a predetermined amplitude level every predetermined time. The selection circuit 30 may attenuate the analog audio signals linearly or gradually. By contrast, from the switching start timing $t_1$ to the switching end timing $t_2$, the selection circuit 30 increases the percentage of the digital audio signals included in the output audio signals from 0% to 100% over time. The selection circuit 30 increases the digital audio signals by, for example, a predetermined amplitude level every predetermined time. The selection circuit 30 may increase the digital audio signals linearly or gradually. With this mechanism, the selection circuit 30 can smoothly switch the output audio signals from the analog audio signals to the digital audio signals.

Figure 3:
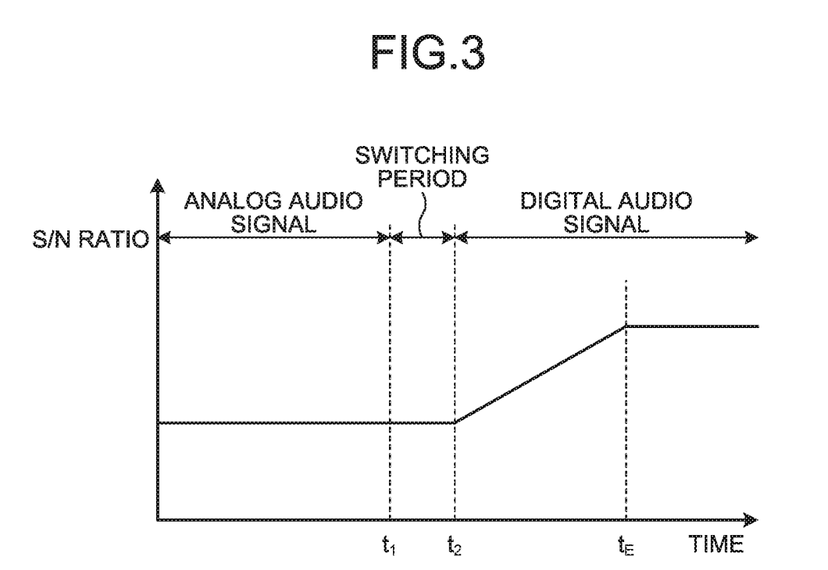
FIG. 3 is a graph representing S/N ratios of output audio signals before, during, and after the switching period.

FIG. 3 is a graph representing S/N ratios of output audio signals before, during, and after the switching period ($t_1$-$t_2$: the switching period, $t_1$-$t_E$: a first period, $t_2$-$t_E$: a second period). In the switching period, the noise addition circuit 34 adds, to the digital audio signals output from the digital audio demodulator 28, noise having an amount equivalent to the amount of noise included in the analog audio signals. Generally, the S/N ratio of the digital audio signals is higher than that of the analog audio signals. By adding the noise as described above, the noise addition circuit 34 makes the S/N ratio of the digital audio signals equivalent to that of the analog audio signals.

Subsequent to the switching period, the noise addition circuit 34 reduces the amount of noise to be added to the digital audio signals over time. The noise addition circuit 34 reduces the amount of noise to be added to the digital audio signals to 0 at the addition end timing $t_E$ at which a predetermined period has elapsed since the switching period. The addition end timing $t_E$ is, for example, a timing when approximately 5 to 10 seconds have elapsed since the switching end timing $t_2$.

With the above-described mechanism, the reception apparatus 10 can prevent the quality of the audio signals output by the reception apparatus 10 from suddenly becoming good when the output audio signals are switched from the analog audio signals to the digital audio signals. Consequently, the reception apparatus 10 can switch the output audio signals from the analog audio signals to the digital audio signals without giving aural discomfort. After the predetermined time has elapsed since the switching period, the reception apparatus 10 can output high-quality digital audio signals.

Figure 4:
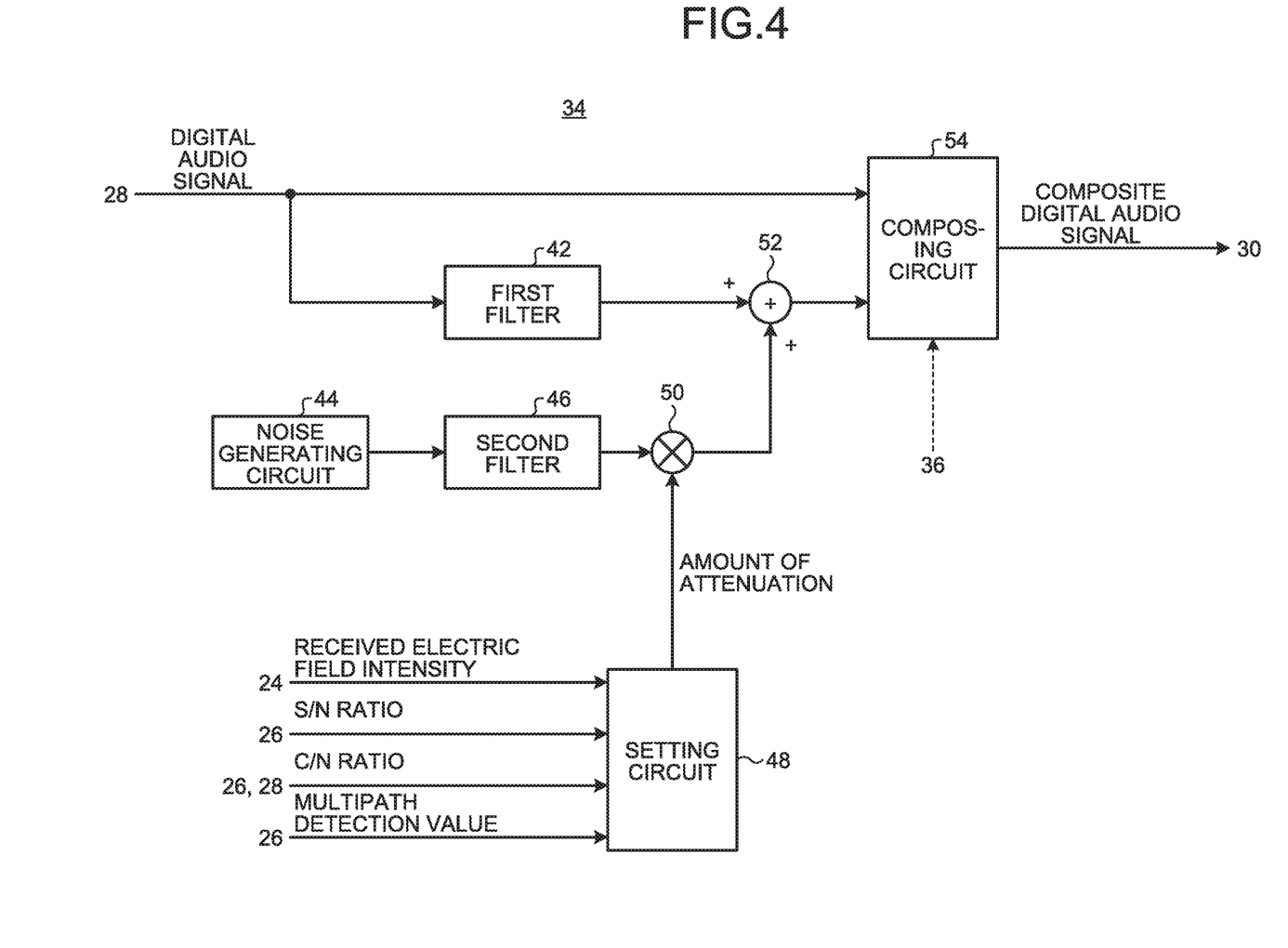
FIG. 4 is a structural diagram of an example of a noise addition circuit.

FIG. 4 is a structural diagram of an example of the noise addition circuit 34. The noise addition circuit 34 includes a first filter 42, a noise generating circuit 44, a second filter 46, a setting circuit 48, a gain adjusting circuit 50, a noise adding circuit 52, and a composing circuit 54.

The first filter 42 acquires the digital audio signals output from the digital audio demodulator 28. The first filter 42 narrows a signal band of the acquired digital audio signals. The first filter 42 narrows the signal band of the digital audio signals such that, for example, the signal band becomes equivalent to that of the analog audio signals. As a result, the first filter 42 can make the signal band of the digital audio signals equivalent to that of the analog audio signals, thereby eliminating discomfort due to the difference in quality in the switching.

The noise generating circuit 44 generates noise. The noise generating circuit 44 according to the present embodiment generates white noise. The noise generating circuit 44 is, for example, a digital signal processer and outputs a data stream representing white noise.

The second filter 46 performs filtering on the noise output from the noise generating circuit 44. The second filter 46 filters the white noise such that, for example, the white noise has characteristics equivalent to the frequency characteristics of the noise included in the analog audio signals.

The setting circuit 48 sets an attenuation amount of the noise to be added to the digital audio signals. The setting circuit 48 sets the attenuation amount based on, for example, at least one among the received electric field intensity of the analog radio broadcast waves, the S/N ratio of the received signals of the analog radio broadcast waves, the C/N ratio of the received signals of the analog radio broadcast waves, and the multipath detection value of the analog radio broadcast waves.

The gain adjusting circuit 50 adjusts gain of the noise output from the second filter 46 based on the attenuation amount set by the setting circuit 48. The gain adjusting circuit 50 adjusts gain of the noise by, for example, multiplying the noise output from the second filter 46 by the set attenuation amount.

The noise adding circuit 52 adds noise having the gain adjusted by the gain adjusting circuit 50 to the digital audio signals whose frequency band is narrowed by the first filter 42.

The composing circuit 54 receives the digital audio signals output from the digital audio demodulator 28 and the digital audio signals output from the noise adding circuit 52. The digital audio signals output from the digital audio demodulator 28 are digital audio signals to which no noise is added. The digital audio signals output from the noise adding circuit 52 are digital audio signals to which noise is added. The composing circuit 54 composes the digital audio signals output from the digital audio demodulator 28 and the digital audio signals output from the noise adding circuit 52 in accordance with control by the controller 36. The composing circuit 54 outputs a composite signal to the selection circuit 30 as the digital audio signal to which noise is added.

Figure 5:
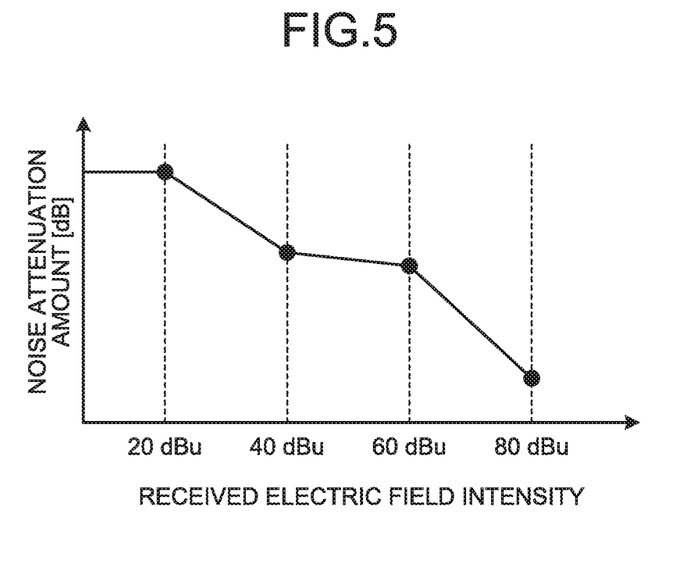
FIG. 5 is a graph representing amounts of attenuation of noise to be added to the digital audio signals with respect to a received electric field intensity of the analog radio broadcast waves.

FIG. 5 is a graph representing amounts of attenuation of noise to be added to the digital audio signals with respect to a received electric field intensity of the analog radio broadcast waves.

The setting circuit 48 stores table information, such as illustrated in FIG. 5, which represents a relation between noise attenuation amounts and intensity of the received electric field of the analog radio broadcast waves. The setting circuit 48 obtains, from the table, the attenuation amount corresponding to the received electric field intensity acquired from the receiver 24. As a result, the noise addition circuit 34 can add noise having an amount corresponding to the received electric field intensity of the analog radio broadcast waves to the digital audio signals in the switching period.

The attenuation amount of noise increases as the received electric field intensity increases. In other words, the noise to be added to the digital audio signals is smaller as the received electric field intensity of the analog radio broadcast waves is higher. In some cases, the noise amounts included in the analog audio signals does not have a linear relation with the received electric field intensity, as illustrated in FIG. 5. Consequently, it is not required that the attenuation amounts of noise to be stored in the table have a linear relation with the received electric field intensity.

Alternatively, the setting circuit 48 may store a table representing the attenuation amount of noise with respect to the S/N ratio of the received signals of the analog radio broadcast waves. In this case, the setting circuit 48 obtains, from the table, the attenuation amount corresponding to the S/N ratio of the received signals of the analog radio broadcast waves acquired by the analog audio demodulator 26. As a result, the noise addition circuit 34 can add, to the digital audio signals in the switching period, noise having an amount corresponding to the S/N ratio of the received signals of the analog radio broadcast waves.

The attenuation amount of noise increases as the S/N ratio increases. In other words, the noise to be added to the digital audio signals is smaller as the S/N ratio of the received signals of the analog radio broadcast waves is higher.

Alternatively, the setting circuit 48 may store a table representing the attenuation amount of noise with respect to the C/N ratio of the received signals of the analog radio broadcast waves. In this case, the setting circuit 48 refers to the table to identify the attenuation amount corresponding to the C/N ratio of the received signals of the analog radio broadcast waves acquired from the analog audio demodulator 26. As a result, the noise addition circuit 34 can add noise having an amount corresponding to the C/N ratio of the received signals of the analog radio broadcast waves to the digital audio signals in the switching period.

The attenuation amount of noise increases as the C/N ratio increases. In other words, the noise to be added to the digital audio signals is smaller as the C/N ratio of the received signals of the analog radio broadcast waves is higher.

Alternatively, the setting circuit 48 may store a table representing the attenuation amount of noise with respect to the multipath detection value of the analog radio broadcast waves. In this case, the setting circuit 48 obtains, from the table, the attenuation amount corresponding to the multipath detection value of the analog radio broadcast waves acquired from the analog audio demodulator 26. As a result, the noise addition circuit 34 can add noise having an amount corresponding to the multipath detection value of the analog radio broadcast waves to the digital audio signals in the switching period.

The attenuation amount of noise decreases as the multipath detection value increases. In other words, the noise to be added to the digital audio signals is larger as the multipath detection value of the analog radio broadcast waves is larger.

Figure 6:
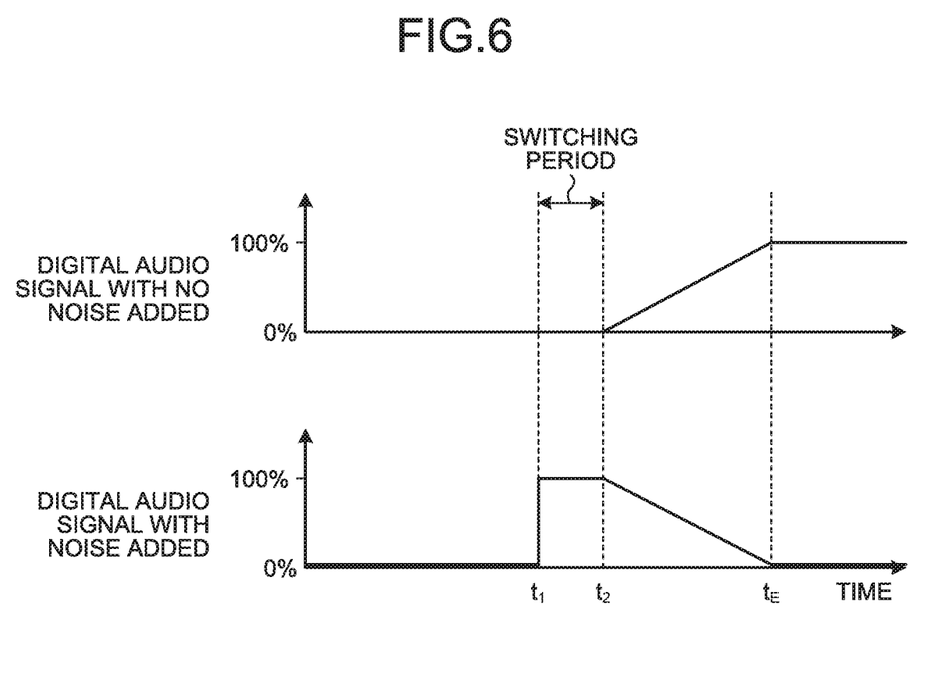
FIG. 6 is a graph representing ratios between digital audio signals to which no noise is added and digital audio signals to which noise is added in composite signals.

FIG. 6 is a graph representing ratios between digital audio signals to which no noise is added and digital audio signals to which noise is added in composite signals.

In the switching period ($t_1$ to $t_2$), the composing circuit 54 sets, to 100%, the percentage of the components of the digital audio signals output from the noise adding circuit 52 included in the composite signals, and sets, to 0%, the percentage of the components of the digital audio signals output from the digital audio demodulator 28 included in the composite signals. In other words, the composing circuit 54 outputs the digital audio signals output from the noise adding circuit 52 as the composite signals in the switching period. The digital audio signals output from the noise adding circuit 52 are digital audio signals to which noise is added.

Subsequently, from the end of the switching period to the addition end timing $t_E$ ($t_2$ to $t_E$), the composing circuit 54 increases the components of the digital audio signals output from the digital audio demodulator 28 included in the composite signals over time. In synchronization with this action, from the end of the switching period to the addition end timing $t_E$ ($t_2$ to $t_E$), the composing circuit 54 reduces the components of the digital audio signals output from the noise adding circuit 52 included in the composite signals over time.

At the addition end timing $t_E$, the composing circuit 54 reduces, to 0%, the percentage of the components of the digital audio signals output from the noise adding circuit 52 included in the composite signals, and increases, to 100%, the percentage of the components of the digital audio signals output from the digital audio demodulator 28 included in the composite signals. In other words, the composing circuit 54 outputs the digital audio signals to which no noise is added as the composite signals after the addition end timing $t_E$.

With the above-described mechanism, the noise addition circuit 34 can add noise to the digital audio signals output from the digital audio demodulator 28 in the switching period. After the switching period, the noise addition circuit 34 can reduce the amount of noise to be added to the digital audio signals over time. The noise addition circuit 34 can reduce the amount of noise to be added to the digital audio signals to zero after the addition end timing $t_E$.

As described above, the reception apparatus 10 according to the present embodiment makes the S/N ratio of the digital audio signals equivalent to that of the analog audio signals when the audio signals to be output are switched from the analog audio signals to the digital audio signals. Consequently, the reception apparatus 10 according to the present embodiment can switch the output audio signals from the analog audio signals to the digital audio signals without giving aural discomfort.

The reception apparatus 10 according to the present embodiment increases the S/N ratio of the digital audio signals over time after the switching. Consequently, the reception apparatus 10 according to the present embodiment can smoothly improve the aural quality of the audio signals.

Modifications

The following describes some modifications of the reception apparatus 10 according to the present embodiment. The configuration of the reception apparatus 10 according to each modification is not explained in detail other than their differences as it is substantially the same as that described with reference to FIGS. 1 to 6.

Figure 7:
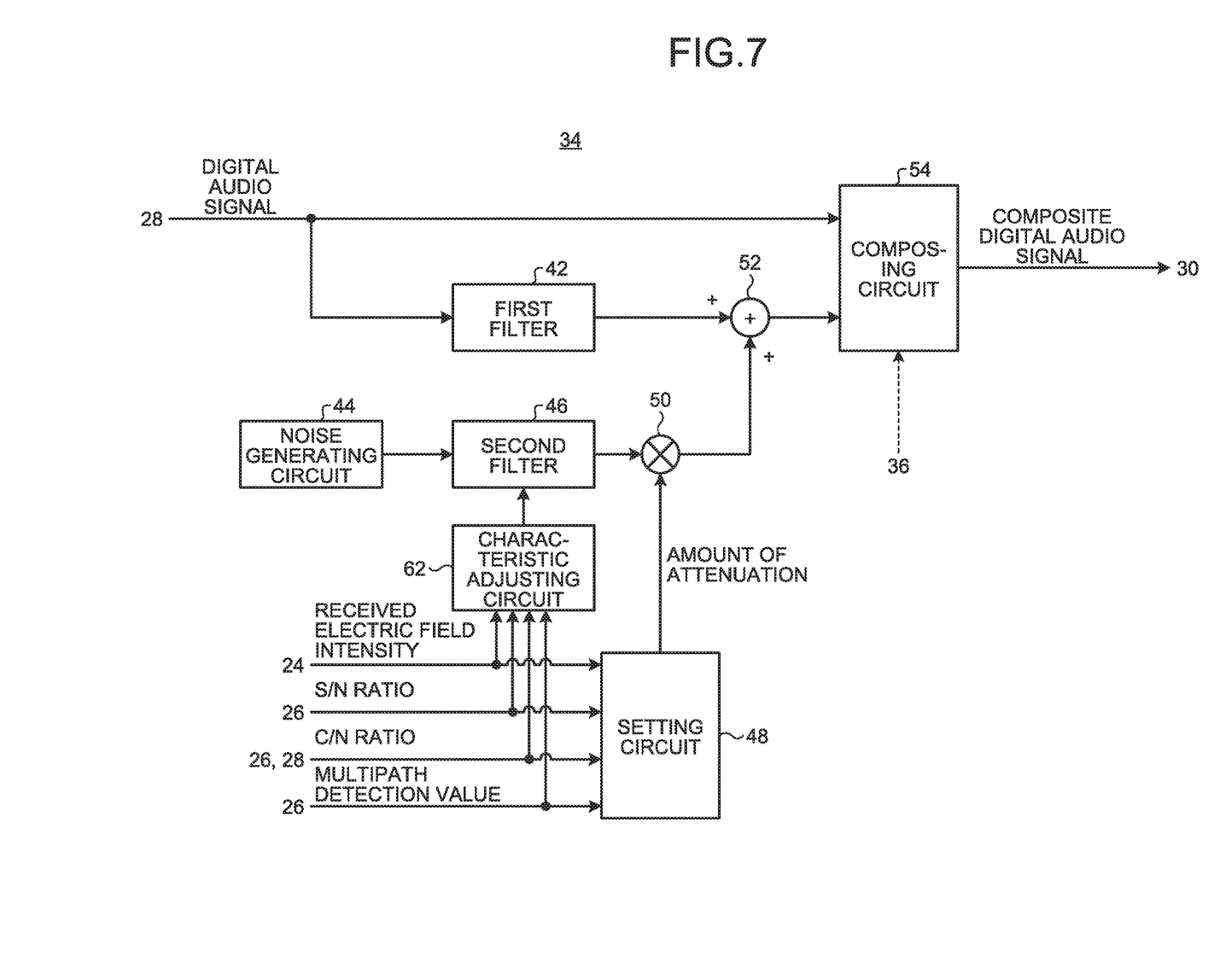
FIG. 7 is a structural diagram of a noise addition circuit according to a first modification.

FIG. 7 is a structural diagram of a noise addition circuit 34 according to a first modification. The noise addition circuit 34 according to the first modification further includes a characteristic adjusting circuit 62. The second filter 46 according to the first modification is capable of changing the filter characteristics based on a set value given from the outside.

The characteristic adjusting circuit 62 changes the characteristics of the second filter 46 that performs filtering on white noise based on the amount of noise included in the analog audio signals. The characteristic adjusting circuit 62 changes the characteristics of the second filter 46 based on, for example, at least one among the received electric field intensity of the analog radio broadcast waves, the S/N ratio of the received signals of the analog radio broadcast waves, the C/N ratio of the received signals of the analog radio broadcast waves, and the multipath detection value of the analog radio broadcast waves. Consequently, the noise addition circuit 34 can change the characteristics of the filter that filters white noise based on the amount of noise included in the analog audio signals.

The frequency characteristics of noise included in the analog audio signals change depending on the gain of the noise. For example, the frequency characteristics of noise included in the analog audio signals change depending on the S/N ratio of the analog audio signals. By the change of the characteristics of the second filter 46 depending on the amount of noise included in the analog audio signals, the noise addition circuit 34 can add noise having the frequency characteristics similar to those of the noise included in the analog audio signals to the digital audio signals. Consequently, the reception apparatus 10 according to the first modification can switch the audio signals to be output from the analog audio signals to the digital audio signals without giving any discomfort.

Figure 8:
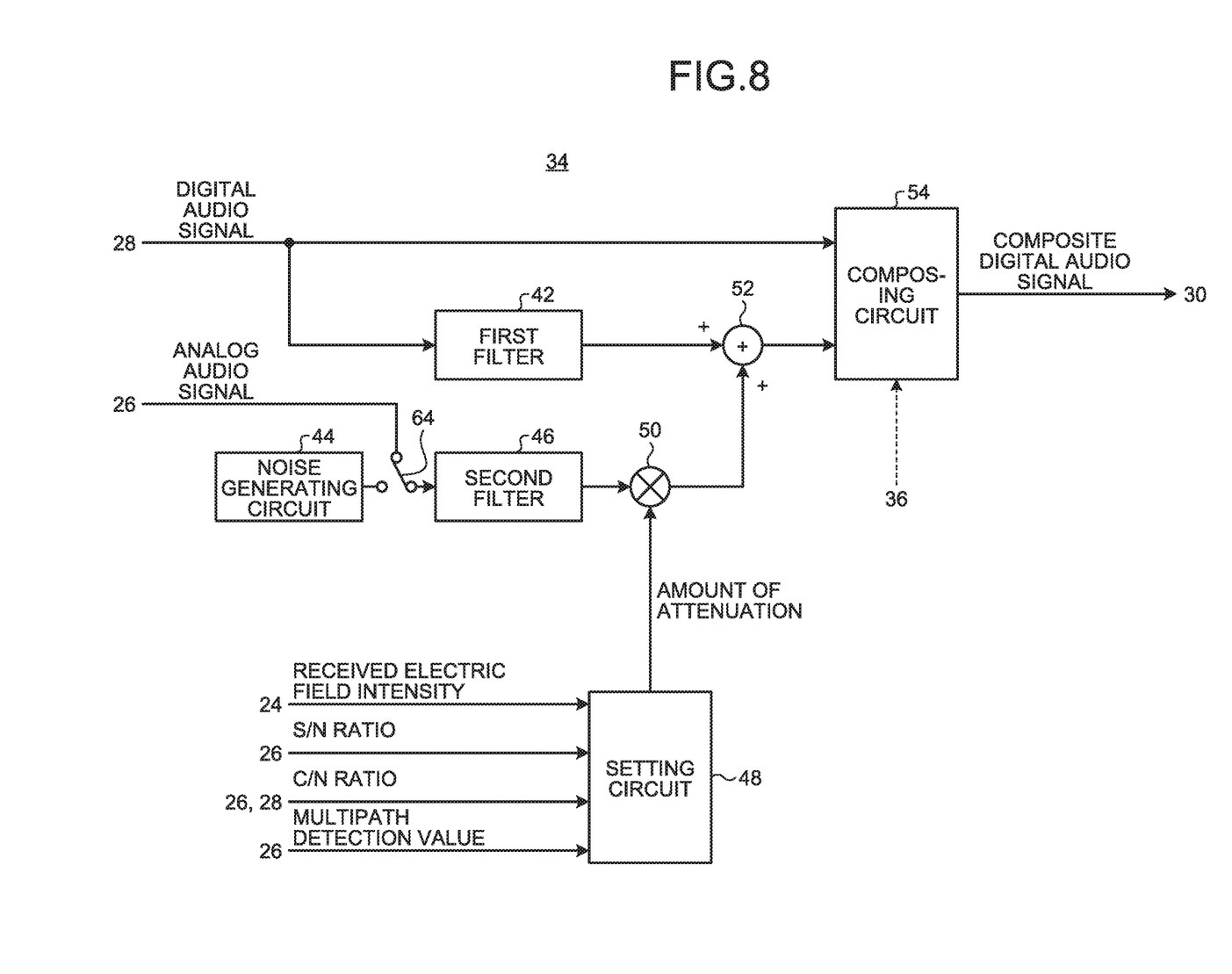
FIG. 8 is a structural diagram of a noise addition circuit according to a second modification.

FIG. 8 is a structural diagram of a noise addition circuit 34 according to a second modification. The noise addition circuit 34 according to the second modification includes a switch 64.

The switch 64 switches between the analog audio signals output from the analog audio demodulator 26 to be given to the second filter 46 and the noise output from the noise generating circuit 44 to be given to the second filter 46, in accordance with the control by the controller 36. When the analog audio signals are given, the second filter 46 cuts out audio components in the analog audio signals and allows high-frequency components to pass through the second filter 46. With this mechanism, the noise addition circuit 34 can add the high-frequency components in the analog audio signals to the digital audio signals as noise.

By adding the high-frequency components in the analog audio signals to the digital audio signals as noise, the noise addition circuit 34 can make the digital audio signals closer to the real analog audio signals. Consequently, the reception apparatus 10 according to the second modification can switch the audio signals to be output from the analog audio signals to the digital audio signals without giving any discomfort.

Figure 9:
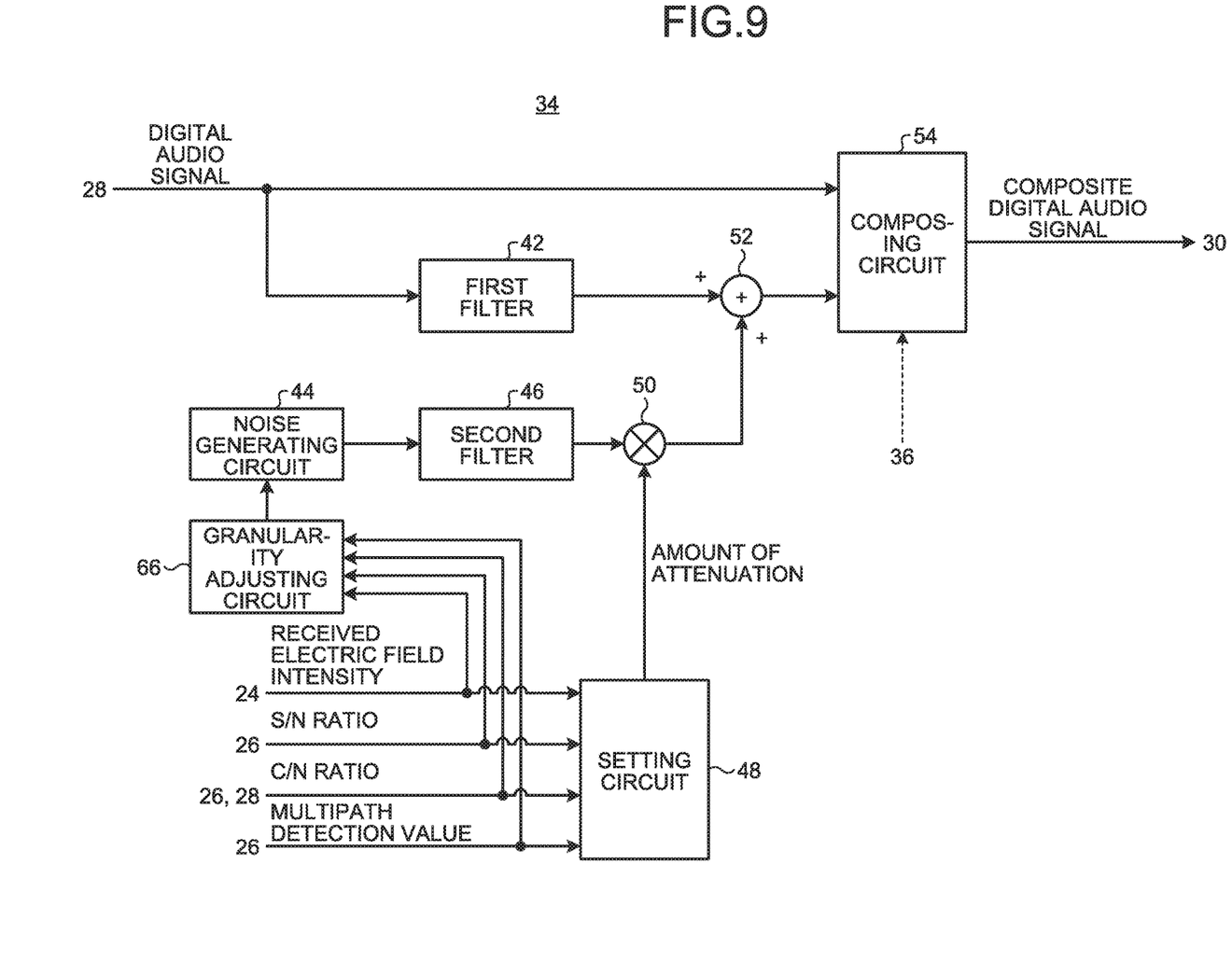
FIG. 9 is a structural diagram of a noise addition circuit according to a third modification.

FIG. 9 is a structural diagram of a noise addition circuit 34 according to a third modification. The noise addition circuit 34 according to the third modification includes a granularity adjusting circuit 66.

The noise generating circuit 44 according to the third modification is capable of changing the granularity of generated noise based on a set value given from the outside. In other words, the noise generating circuit 44 can change coarseness of generated noise. To make the granularity larger, or make the noise rougher, the noise generating circuit 44 makes the period of the signals representing white noise longer, for example; and to make the granularity smaller, or make the noise finer, the noise generating circuit 44 makes the period of the signals representing white noise shorter.

The granularity adjusting circuit 66 changes the granularity of white noise generated by the noise generating circuit 44 based on the amount of noise included in the analog audio signals. The granularity adjusting circuit 66 changes the granularity of white noise based on, for example, at least one among the received electric field intensity of the analog radio broadcast waves, the S/N ratio of the received signals of the analog radio broadcast waves, the C/N ratio of the received signals of the analog radio broadcast waves, and the multipath detection value of the analog radio broadcast waves. Consequently, the noise addition circuit 34 can change the granularity of white noise based on the amount of noise included in the analog audio signals.

The granularity of noise included in the analog audio signals changes depending on the gain of the noise. The granularity of noise increases as the gain of the noise increases, for example. By changing the granularity of white noise depending on the amount of noise included in the analog audio signals, the noise addition circuit 34 can add noise having the frequency characteristics similar to those of the noise included in the analog audio signals to the digital audio signals. Consequently, the reception apparatus 10 according to the third modification can switch the audio signals to be output from the analog audio signals to the digital audio signals without giving any discomfort.

Figure 10:
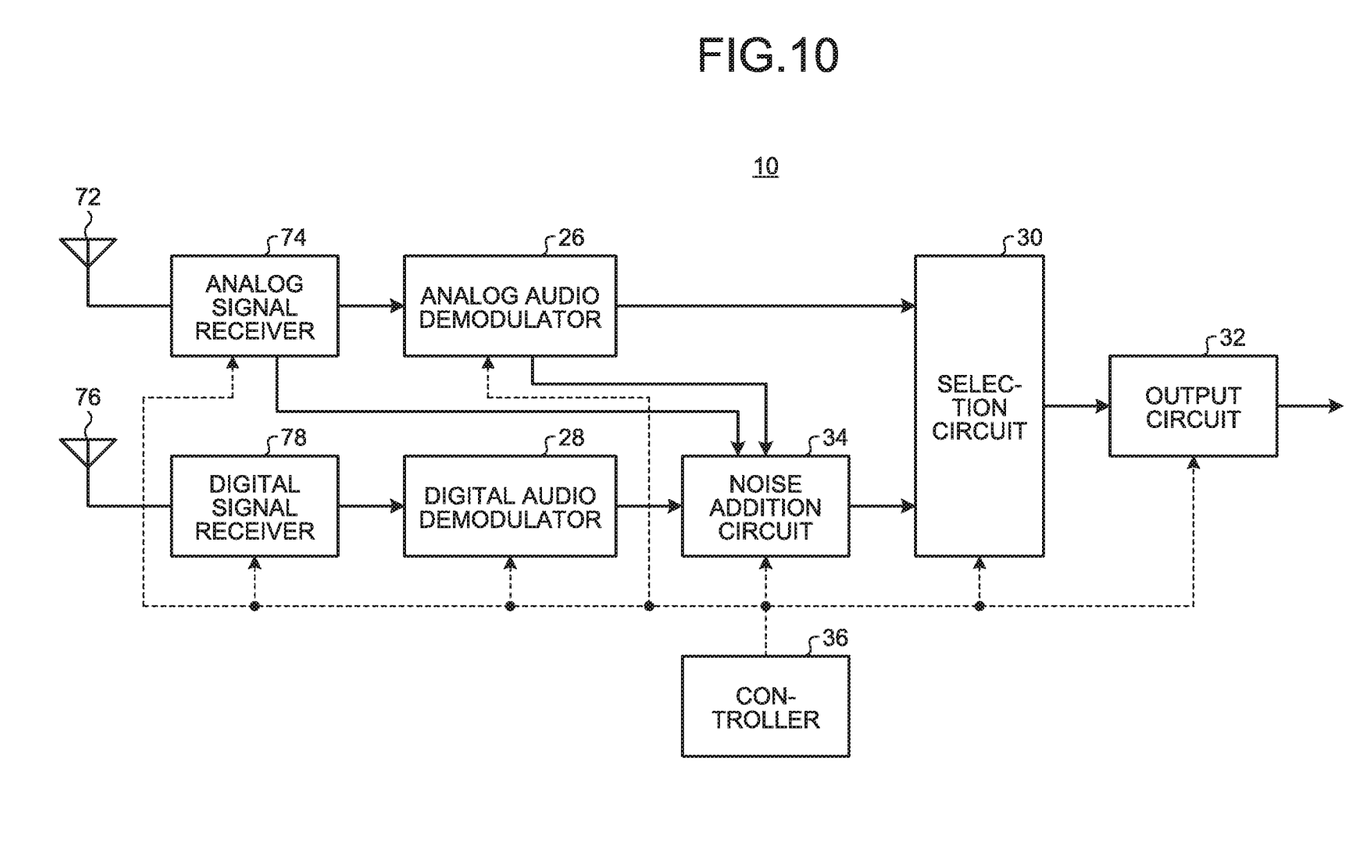
FIG. 10 is a structural diagram of a reception apparatus according to a fourth modification.

FIG. 10 is a structural diagram of a reception apparatus 10 according to a fourth modification. The reception apparatus 10 according to the fourth modification includes an analog signal antenna 72, an analog signal receiver 74, a digital signal antenna 76, and a digital signal receiver 78 instead of the antenna 22 and the receiver 24.

The analog signal antenna 72 captures analog radio broadcast waves radiated above the ground. The analog signal receiver 74 receives a first signal modulated into the analog radio broadcast waves captured by the analog signal antenna 72. The analog signal receiver 74 gives the first signal to the analog audio demodulator 26. The first signal is a received signal of the analog radio broadcast waves. For example, the first signal is an intermediate frequency signal. The analog signal receiver 74 measures the received electric field intensity of the analog radio broadcast waves. The analog signal receiver 74 gives the value representing the measured received electric field intensity of the analog radio broadcast waves to the noise addition circuit 34.

The digital signal antenna 76 captures digital radio broadcast waves radiated above the ground. The digital signal receiver 78 receives a second signal modulated into the digital radio broadcast waves captured by the digital signal antenna 76. The digital signal receiver 78 gives the second signal to the digital audio demodulator 28. The second signal is a received signal of the digital radio broadcast waves. For example, the second signal is an intermediate frequency signal.

The analog radio broadcast waves and the digital radio broadcast waves may be modulated in different frequency bands. When the analog radio broadcast waves and the digital radio broadcast waves have been modulated in different frequency bands, the reception apparatus 10 according to the fourth modification can switch the output audio signals from the analog audio signals to the digital audio signals without giving aural discomfort. After the switching is completed, the reception apparatus 10 according to the fourth modification can smoothly improve the aural quality of the audio signals.

Figure 11:
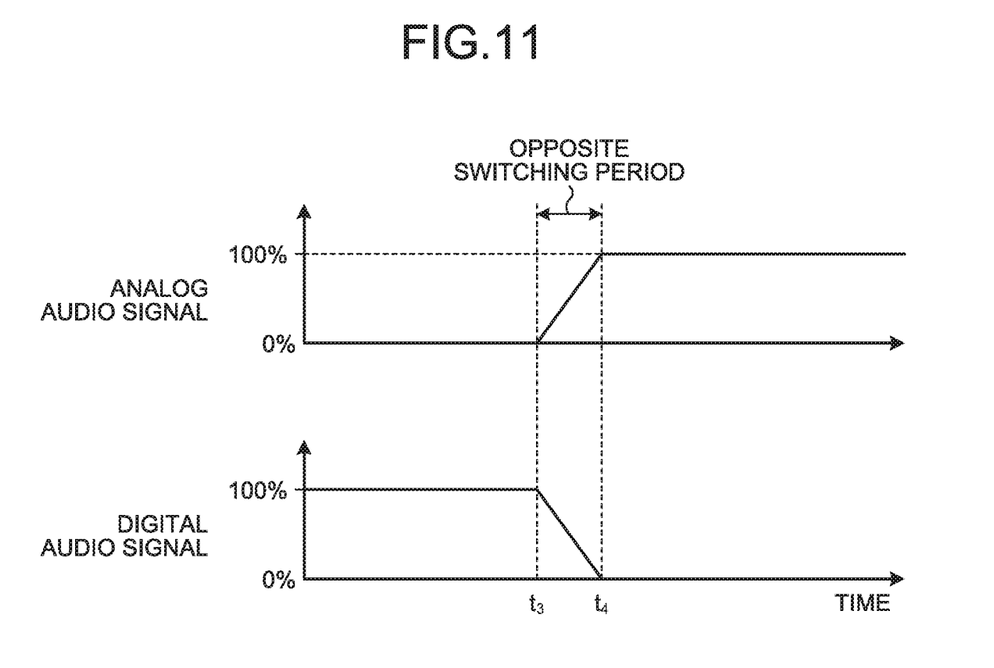
FIG. 11 is a graph representing ratios between analog audio signals and digital audio signals included in output audio signals in an opposite switching period according to a fifth modification.

FIG. 11 is a graph representing ratios between analog audio signals and digital audio signals included in output audio signals in an opposite switching period according to a fifth modification. The reception apparatus 10 according to the fifth modification adds noise to the digital audio signals in an opposite switching period for switching from a state of selecting the digital audio signals as the output audio signals to a state of selecting the analog audio signals as the output audio signals.

When the reception state is switched from a good state to a bad state, the selection circuit 30 switches from a state of selecting the digital audio signals as the output audio signals to a state of selecting the analog audio signals as the output audio signals in the opposite switching period. The switching period is, for example, approximately 1 second. When the reception state is switched from a state where the reception apparatus 10 can demodulate the digital audio signals from the received signals of the digital radio broadcast waves to a state where the reception apparatus 10 fails to demodulate the digital audio signals, for example, the selection circuit 30 switches from a state of selecting the digital audio signals as the output audio signals to a state of selecting the analog audio signals as the output audio signals.

From a switching start timing $t_3$ to a switching end timing $t_4$, the selection circuit 30 reduces the percentage of the digital audio signals included in the output audio signals from 100% to 0%/o over time. The selection circuit 30, for example, attenuates the digital audio signals by a predetermined amplitude level every predetermined time. The selection circuit 30, for example, may attenuate the digital audio signals linearly or gradually. From the switching start timing $t_3$ to the switching end timing $t_4$, the selection circuit 30 increases the percentage of the analog audio signals included in the output audio signals from 0% to 100% over time. The selection circuit 30, for example, increases the analog audio signals by a predetermined amplitude level every predetermined time. The selection circuit 30, for example, may increase the analog audio signals linearly or gradually. With this mechanism, the selection circuit 30 can smoothly switch the output audio signals from the digital audio signals to the analog audio signals.

Figure 12:
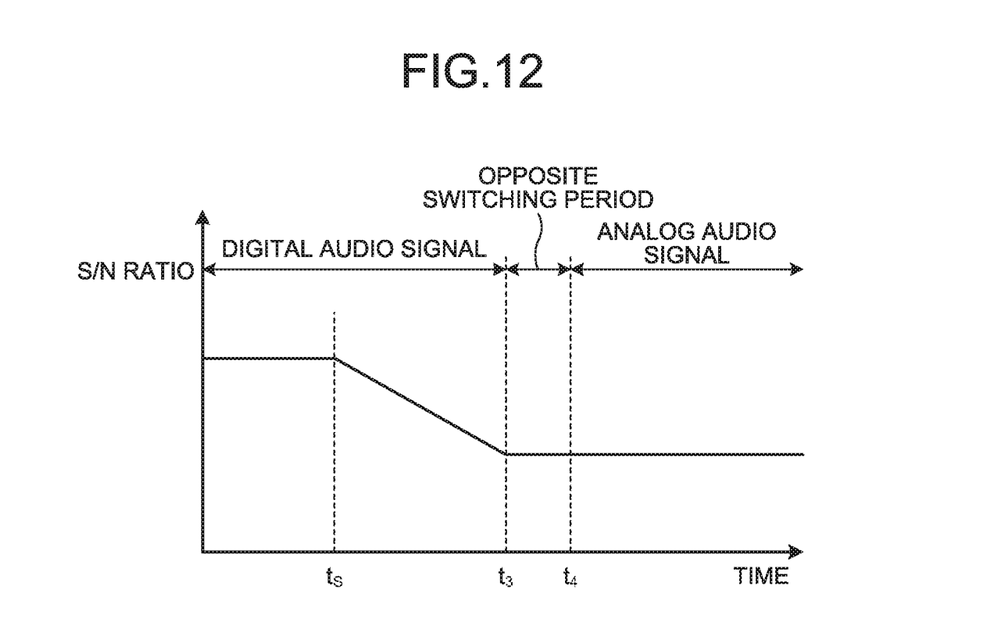
FIG. 12 is a graph representing S/N ratios of the output audio signals before, during, and after the opposite switching period according to the fifth modification.

FIG. 12 is a graph representing S/N ratios of the output audio signals before, during, and after the opposite switching period according to the fifth modification. In the opposite switching period, the noise addition circuit 34 adds noise having an amount equivalent to the amount of noise included in the analog audio signals to the digital audio signals output from the digital audio demodulator 28.

The noise addition circuit 34 starts to add noise to the digital audio signals at an addition start timing $t_S$. The addition start timing $t_S$ is a timing a predetermined period before the opposite switching period. The addition start timing $t_S$ is, for example, a timing when approximately 5 to 10 seconds before the switching start timing $t_3$. The noise addition circuit 34 sets the amount of noise to be added to 0 at the addition start timing $t_S$. After the addition start timing $t_S$, the noise addition circuit 34 increases the amount of noise to be added over time. At the switching start timing $t_3$, the noise addition circuit 34 makes the amount of noise to be added to the digital audio signals equivalent to that of noise included in the analog audio signals.

The reception apparatus 10 according to the present modification can prevent the quality of the audio signals output by the reception apparatus 10 from suddenly becoming bad when switching the output audio signals from the digital audio signals to the analog audio signals. Consequently, the reception apparatus 10 can switch the output audio signals from the digital audio signals to the analog audio signals without giving aural discomfort. After the opposite switching period has elapsed, the reception apparatus 10 can output the analog audio signals.

The analog audio demodulator 26 and the digital audio demodulator 28 according to the present modification each include a buffer in the output stage. With this configuration, the digital audio demodulator 28 can continue to output the digital audio signals in a predetermined period after the reception state is switched to the state where the reception apparatus 10 fails to demodulate the digital audio signals. Consequently, the noise addition circuit 34 can add noise from the timing a predetermined period before the opposite switching period. The analog audio demodulator 26 can output the analog audio signals synchronized with the digital audio signals. Consequently, the selection circuit 30 can switch the output audio signals between the analog audio signals and the digital audio signals to which noise is added without any time lag.

While the functions of the selection circuit 30 and the noise addition circuit 34 according to the present embodiment are implemented by a dedicated hardware circuit, the embodiment is not limited thereto. One or both of the functions of the selection circuit 30 and the noise addition circuit 34 may be implemented by software. The controller has, for example, a hardware configuration including a central processing unit (CPU) and a storage device. One or both of the functions of the selection circuit 30 and the noise addition circuit 34 may be implemented by the CPU executing a computer program stored in the storage device.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A demodulation apparatus comprising:
    an analog audio demodulator configured to demodulate a received signal of an analog radio broadcast wave into an analog audio signal and output the analog audio signal;
    a digital audio demodulator configured to demodulate a received signal of a digital radio broadcast wave into a digital audio signal and output the digital audio signal, the digital radio broadcast wave including an audio signal indicative of a same content as an audio signal included in the analog radio broadcast wave and being broadcasted simultaneously with the analog radio broadcast wave;
    a selection circuit configured to select, as an output audio signal, either the analog audio signal or the digital audio signal; and
    a noise addition circuit configured to add noise to the digital audio signal in a first period including a switching period for switching from a state where the analog audio signal is selected as the output audio signal to a state where the digital audio signal is selected as the output audio signal.

2. The demodulation apparatus according to claim 1, wherein
    the first period further includes a second period subsequent to the switching period, and
    the noise addition circuit reduces an amount of the noise to be added to the digital audio signal over time during the second period.

3. The demodulation apparatus according to claim 1, wherein the noise addition circuit adds, to the digital audio signal in the switching period, the noise having an amount corresponding to an amount of noise included in the analog audio signal.

4. The demodulation apparatus according to claim 1, wherein the noise addition circuit reduces the amount of the noise to be added to the digital audio signal to 0 at a timing when a predetermined period has elapsed since the switching period.

5. The demodulation apparatus according to claim 1, wherein, when a reception state is switched from a state where the digital audio signal fails to be demodulated from the received signal of the digital radio broadcast wave to a state where the digital audio signal is able to be demodulated from the received signal of the digital radio broadcast wave, the selection circuit switches from the state where the analog audio signal is selected as the output audio signal to the state where the digital audio signal is selected as the output audio signal.

6. The demodulation apparatus according to claim 1, wherein the noise addition circuit adds, to the digital audio signal in the switching period, the noise having an amount corresponding to an intensity of a received electric field of the analog radio broadcast wave.

7. The demodulation apparatus according to claim 1, wherein the noise addition circuit adds, to the digital audio signal in the switching period, the noise having an amount corresponding to an S/N ratio of the received signal of the analog radio broadcast wave.

8. The demodulation apparatus according to claim 1, wherein the noise addition circuit adds, to the digital audio signal in the switching period, the noise having an amount corresponding to a C/N ratio of the received signal of the analog radio broadcast wave.

9. The demodulation apparatus according to claim 1, wherein the noise addition circuit adds, to the digital audio signal in the switching period, the noise having an amount corresponding to an amount of a multipath signal component included in the analog radio broadcast wave.

10. The demodulation apparatus according to claim 1, wherein the noise addition circuit adds, as the noise to the digital audio signal, a signal obtained by filtering white noise based on a frequency characteristic of noise included in the analog audio signal.

11. The demodulation apparatus according to claim 10, wherein the noise addition circuit changes a characteristic of a filter for filtering the white noise based on an amount of the noise included in the analog audio signal.

12. The demodulation apparatus according to claim 1, wherein the noise addition circuit adds, as the noise to the digital audio signal, a high-frequency component of the analog audio signal.

13. The demodulation apparatus according to claim 1, wherein the noise addition circuit adds, as the noise to the digital audio signal, white noise whose granularity has been changed based on an amount of noise included in the analog audio signal.

14. A reception apparatus comprising:
    an antenna configured to capture an analog radio broadcast wave and a digital radio broadcast wave being simultaneously broadcasted, the digital radio broadcast wave including an audio signal indicative of a same content as an audio signal included in the analog radio broadcast wave, and;
    a receiver configured to receive an first signal and a second signal, the first signal being modulated into the analog radio broadcast wave and the second signal being modulated into the digital radio broadcast wave captured by the antenna;
    an analog audio demodulator configured to demodulate the first signal into an analog audio signal and output the analog audio signal;
    a digital audio demodulator configured to demodulate the second signal into a digital audio signal and output the digital audio signal;
    a selection circuit configured to select, as an output audio signal, either the analog audio signal or the digital audio signal; and
    a noise addition circuit configured to add noise to the digital audio signal in a first period including a switching period for switching from a state where the analog audio signal is selected as the output audio signal to a state where the digital audio signal is selected as the output audio signal.

15. A demodulation method implemented by a computer, the method comprising:

demodulating a received signal of an analog radio broadcast wave and outputting an analog audio signal;

demodulating a received signal of a digital radio broadcast wave and outputting a digital audio signal, the digital radio broadcast wave including an audio signal indicative of a same content as an audio signal included in the analog radio broadcast wave and being broadcasted simultaneously with the analog radio broadcast wave;

selecting, as an output audio signal, either the analog audio signal or the digital audio signal; and adding noise to the digital audio signal in a first period including a switching period for switching from a state where the analog audio signal is selected as the output audio signal to a state where the digital audio signal is selected as the output audio signal.

* * * * *